United States Patent [19]
Sendelweck

[11] Patent Number: 5,075,766
[45] Date of Patent: Dec. 24, 1991

[54] TELEVISION ON-SCREEN CHARACTER DISPLAY SYSTEM WITH PROVISIONS FOR EDGING CHARACTERS

[76] Inventor: Gene K. Sendelweck, 5415 E. 72nd St., Indianapolis, Ind. 46250

[21] Appl. No.: 513,455
[22] Filed: Apr. 30, 1990
[51] Int. Cl.⁵ .......................................... H04N 9/64
[52] U.S. Cl. ............................................. 358/22
[58] Field of Search ........................... 358/21 R, 22

[56] References Cited
FOREIGN PATENT DOCUMENTS
57587 4/1984 Japan .................................... 358/22
229986 12/1984 Japan .................................... 358/22

Primary Examiner—John W. Shepperd

[57] ABSTRACT

A television system includes a one-chip television signal processing IC including luminance and chrominance signal processing sections and character signal input terminals intended to receive character signals corresponding to the colored characters to be displayed by an associated display device and a character brightness control terminal intended to receive an adjustable DC control signal for setting the brightness of the colored characters. A blanking signal for blanking the video image is coupled to one of the character signal input terminals instead of a character signal, and an IC supply voltage corresponding to a black image level is coupled to the character brightness control terminal instead of an adjustable DC brightness control signal. The blanking signal is used for blanking the video image behind a displayed character body and also for emphasizing displayed characters, e.g., by "edging" the character bodies. The blanking signal may also be used for blanking the entire video image at various times, such as during channel changes.

9 Claims, 3 Drawing Sheets

TELEVISION ON-SCREEN CHARACTER DISPLAY SYSTEM WITH PROVISIONS FOR EDGING CHARACTERS

FIELD OF THE INVENTION

The present invention concerns the field of so called "on-screen display" systems for television receivers and monitors.

BACKGROUND OF THE INVENTION

Television receivers and monitors (i.e., a television system not having a tuner) often include an "on-screen display" (OSD) system for displaying characters in one or more colors on the screen of an image display device such as a kinescope. The OSD system may, for example, be used to display the channel number of a currently tuned channel, status information or instructions.

Sometimes the OSD system has provisions for "blanking" the video image behind the characters in order to make the characters stand out in a field of video information. The characters may also be highlighted by "edging" the borders of the characters in black, by "shading" the characters on one side, or by displaying the characters within a black background box sometimes called a "surround". If the characters are to be highlighted in these ways, character signals having pulses corresponding to the blanking areas behind the characters and/or the black areas adjacent to the bodies of the characters, as well as character signals having pulses corresponding to the bodies of the characters themselves, must be generated and appropriate levels must be inserted into the video signals coupled to the display device at times corresponding to the character pulses and character blanking pulses.

In one well known type of OSD, one or more character signals representing the bodies of characters are coupled directly to respective ones of red, green and blue kinescope drive circuits. A character blanking signal for blanking the video image behind the characters and for "edging" the characters is coupled to an electronic video switch included in the path by which the luminance signal is coupled to the kinescope drive circuits. The switch operates in response to the pulses of the character blanking signal to insert a level corresponding to black in the luminance signal coupled to the kinescope drive circuits.

Many modern television receivers have a large portion of the intermediate frequency (IF), video and sound detection, and luminance, chrominance and deflection signal processing sections incorporated within a single integrated circuit (IC) sometimes called a "one-chip" or "jungle chip" IC. Such one-chip television ICs receive the IF signal produced by a tuner at an input terminal and generate either red, green and blue color (R, G, and B) output signals or luminance (Y) and red, green and blue color difference (R-Y, G-Y and B-Y) output signals at respective output terminals.

One-chip television ICs often also include OSD character signal input terminals. For example, the TA8680 one-chip television IC, available from the Toshiba Corp., has "red" and "green" OSD character signal input terminals intended to be used to receive red and green character signals for causing signal levels suitable for displaying red and green characters on the screen of a kinescope to be inserted into red and green color difference (R-Y and G-Y) output signals. The TA8680 IC also has a character brightness control input terminal intended to be used to receive an adjustable DC control signal for controlling the brightness of the red and green characters. Specifically, the level of the DC control signal determines a signal level which is inserted into the luminance (Y) output signal at times determined by the pulses of character signals coupled to the character signal input terminals.

While the use of a one-chip television IC such as the TA8680 is desirable since much of the signal processing portion of the television receiver is incorporated in a single IC, such ICs may limit the number of features that can be provided by the television receiver. For example, the TA8680 IC does not include input terminals for receiving character blanking signals by which video information can be blanked prior to the insertion of the signal levels corresponding to the pulses of the character signals into the R-Y and G-Y color difference signals. Therefore, ICs such as the TA8680 cannot be used by themselves to highlight characters by blanking behind the characters or by edging, shading or forming a surround.

SUMMARY OF THE INVENTION

The present invention is directed in part to enhancing the limited OSD provisions of one-chip television ICs similar to those of the TA8680 in order to provide for blanking behind characters and/or for black areas adjacent to the bodies of the characters in a relatively inexpensive way, requiring only a limited amount of external circuitry.

One aspect of the present invention involves an arrangement in which a one-chip television IC having OSD provisions similar to those of the TA8680 has a blanking signal coupled to one of the OSD character signal input terminals instead of a character signal and has a fixed level corresponding to an image black level coupled to the character brightness control input terminal instead of an adjustable DC control signal. Advantageously, the fixed level can be an IC supply voltage. In this manner the character signal input may be used to produce a black or blanked portion of a displayed image. The blanking signal coupled to the character signal input terminal maybe used to highlight a character by blanking behind the character and/or by edging, shading or forming a surround. The blanking signal may also be advantageously used to blank the entire screen of the display device, for example, during channel changes.

BRIEF DESCRIPTION OF THE DRAWING

The invention will be described with reference to the accompanying drawing in which.

DETAILED DESCRIPTION OF THE DRAWING

Figure 1:
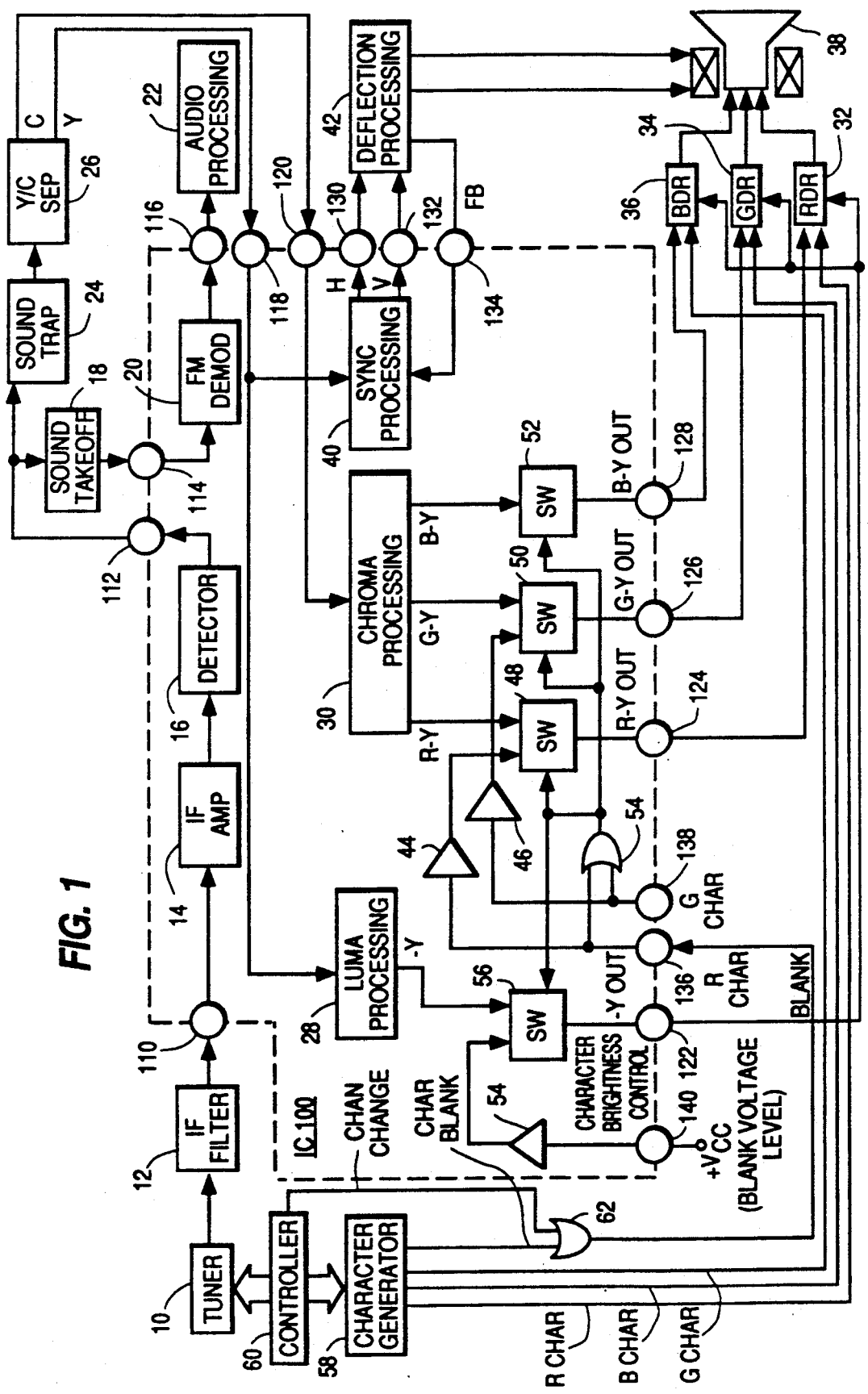
FIG. 1 is a block diagram of a television receiver including an OSD system constructed according to the preferred embodiment of the present invention.

A large portion of the television receiver shown in FIG. 1 is incorporated within a one-chip television IC 100 such as the TA8680 previously referred to. Those portions within IC 100 are surrounded by a dotted line.

Input and output terminals of IC 100 are indicated by large circles and are identified with reference numbers in the "100s".

The television receiver shown in FIG. 1 includes a tuner 10 and an intermediate frequency (IF) filter section 12 for converting the radio frequency (RF) television signal for a selected channel to a corresponding IF signal with an amplitude modulated video carrier and a frequency modulated sound carrier. The IF signal is coupled to an IF signal input terminal 110 of IC 100. The IF signal is amplified by an amplifier 14. A baseband video signal and an intercarrier sound signal (at the difference frequency between the video and sound carriers) are provided as a component of a combined signal at output terminal 112 of IC 100 by a detector section 16.

The intercarrier sound signal is separated from the baseband video signal by a sound "takeoff" filter 18 and coupled via an IC input terminal 114 to an FM demodulator 20. The demodulated audio signal is coupled through an IC output terminal 116 to an audio processing unit 22.

The intercarrier sound signal of the combined signal produced at IC output terminal 112 is removed by a sound trap 24 and the remaining baseband video signal is coupled to luminance/chrominance (Y/C) separator 26. The separated luminance (Y) component of the baseband video signal is coupled via an IC input terminal 118 to luminance signal processing section 28 of IC 100. Luminance signal processing section 28 includes circuits for processing the received luminance component to control the brightness, contrast and sharpness properties of a reproduced image. The separated chrominance component is coupled to a chrominance signal processing section 30 through an IC input terminal 120. Chrominance signal processing section 30 includes circuits for demodulating the chrominance component to produce red, green and blue color difference (R-Y, G-Y and B-Y) signals and for processing these signals to control the saturation and that properties of the reproduced image.

The processed luminance (-Y) and color difference (R-Y, G-Y and B-Y) signals are coupled via respective output terminals 122, 124, 126 and 128 to red (R), green (G) and blue (B) kinescope drive circuits 32, 34 and 36. The output luminance signal is symbolically identified as -Y to indicate that positive-going portions of the luminance signal correspond to black-going portions of a reproduced image and negative-going portions of the luminance signal correspond to white-going portions of the reproduced image. In each of kinescope drive circuits 32, 34 and 36, the luminance signal is combined ("matrixed") with the respective color difference signal to produce a respective color drive signal. The red (R), green (G) and blue (B) drive signals are coupled to respective electron guns of a kinescope 38.

A synchronization (sync) signal processing section 40 derives horizontal (H) and vertical (V) sync pulses in response to horizontal and vertical sync pulses contained in the separated luminance component received at IC input terminal 118. The horizontal and vertical sync pulses are coupled through respective IC output terminals 130 and 132 to a deflection signal processing unit 42 which controls the scanning of the electron beams produced in response to the red (R), green (G) and blue (B) drive signals. A horizontal flyback (FB) pulse produced by deflection section 42 is coupled to sync processing section 40 through an IC input terminal 134 in order to ensure proper scanning.

Certain circuits associated with the sections of the television receiver described so far, such as automatic gain control (AGC) and automatic fine tuning (AFT) circuits, various filters coupled to detector 16 and luminance, chrominance and sync processing sections 28, 30 and 40, and contrast, brightness, sharpness, saturation and tint adjustment circuits, have not been shown in FIG. 1 for the sake of simplicity.

The remaining portion of the television receiver shown in FIG. 1 comprises an on screen display (OSD) system for displaying characters on the screen of kinescope 38 in order to provide status information, such as the channel number of a channel currently being tuned and the current time, or instructions, such as those relating to the selection of various operating modes (e.g., stereo or monaural sound reproduction) or the adjustment of various parameters (e.g., brightness, contrast, saturation and tint).

The OSD portion of one-chip television IC 100 is similar to that of the TA8680 IC. IC 100 includes a red (R) character signal input terminal 136 and a green (G) character signal input terminal 138 intended to be used for receiving respective character signals for producing red and green characters or characters produced in combination these colors on the screen of kinescope 38. The red (R) and green (G) character signals include pulses which occur at appropriate times and have appropriate time durations for producing the characters at desired horizontal and vertical locations on the screen of kinescope 38. The red and green character signals are amplified by respective amplifiers 44 and 46 and the resultant signals are coupled to respective electronic video switches 48 and 50. Switch 48 normally coupled the red color difference (R-Y) signal produced by chrominance signal processing section 30 to red color difference signal output terminal 124, and selectively couples the amplified red character signal produced by amplifier 44 to red color difference signal output terminal 124 when a red character pulse is received at red character signal input terminal 136. Similarly, switch 50 selectively couples either the green color difference (G-Y) signal or the amplified green character signal to green color difference signal output terminal 126. An electronic video switch 52 normally couples the blue color difference (B-Y) signal to blue color difference output terminal 128, and selectively decouples the blue color difference (B-Y) signal from blue color difference signal output terminal 128 when either a red or green character pulse is received. The control signal for switches 48, 50 and 52 is generated by an "or" function circuit, represented by an "or" gate 54, which has its inputs coupled to character signal input terminals 136 and 138.

IC 100 also includes a character brightness control signal input terminal 140 intended to be used for receiving an adjustable DC control voltage which determines the brightness of the displayed characters. In the present embodiment, in which IC 100 has similar OSD provisions to those of the TA8680, the brightness of displayed characters is inversely related to the magnitude of the character brightness control voltage coupled to character brightness control signal input terminal 140. The DC brightness control signal is coupled via a buffer amplifier 54 to an electronic video switch 56. Switch 56 normally couples the luminance (-Y) signal produced by luminance signal processing section 28 to luminance signal output terminal 122, and selectively couples the brightness control level provided by amplifier 54 to luminance signal output terminal 122 when either a red or a green character pulse is received. Switch 56 is also controlled by the output signal of "or" function circuit 54.

As earlier noted it is often desirable to make displayed characters more visible within a video image. This may be accomplished by removing or "blanking" the video image behind the characters. The displayed characters may also be highlighted by "edging" the borders of the characters in black, "shading" one side of the characters in black, or by locating the characters within a black "surround" box. Blanking, edging, shading or forming a "surround" requires the inclusion in the luminance channel of an electronic switch which is caused to insert a DC level corresponding to black in the luminance signal at the appropriate times in response to a "character blanking" signal.

Figure 3:
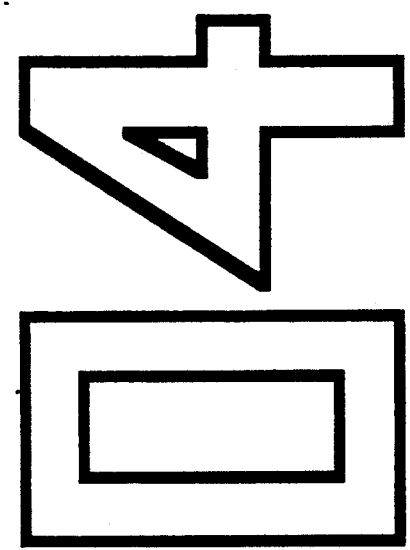
FIG. 3 is a pictorial representation of characters displayed by the OSD system shown in FIG. 1.
Figure 2:
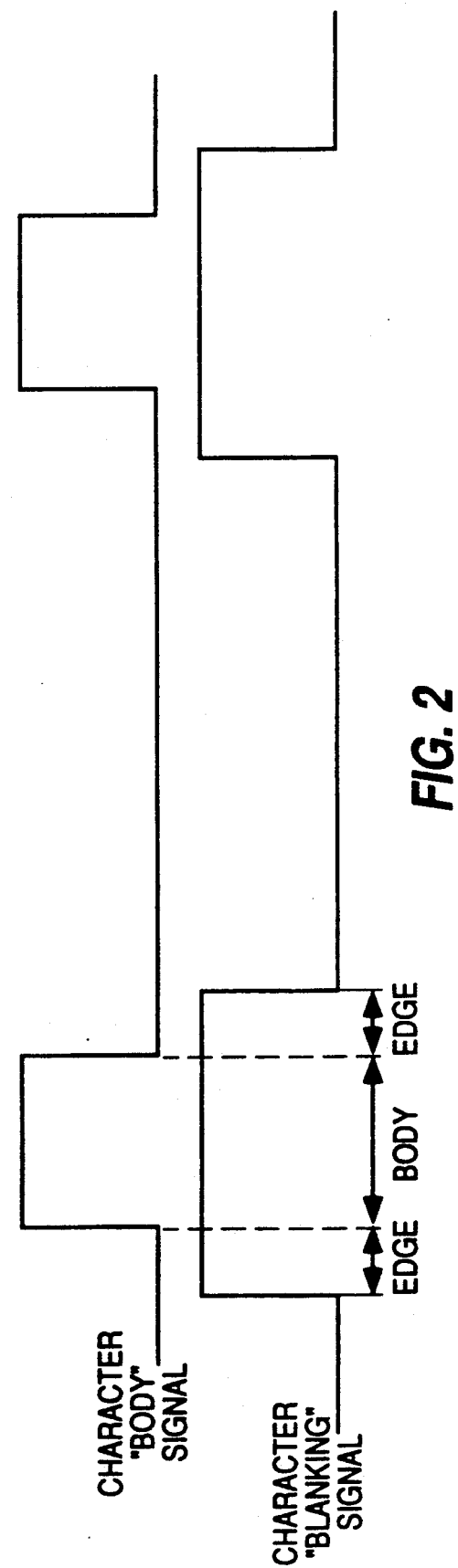
FIG. 2 is a graphical representation of signal waveforms useful in understanding the operation of the OSD system shown in FIG. 1.

The waveforms shown in FIG. 2 indicate the nature of typical character and character blanking signals utilized to display edged characters, such as numbers "0" and "4" shown in FIG. 3. The upper waveform represents a character signal which produces the bodies of the characters. The lower waveform represents a character blanking signal which causes the video image behind the bodies of the characters to be blanked and also produces the black edges surrounding the bodies of the characters. In the waveforms, each pulse corresponds to a horizontal slice of a respective character occurring within a particular horizontal scan line.

In the television receiver shown in FIG. 1, character and character blanking signals of the type shown in FIG. 2 are generated by a character generator 58 in response to commands from a controller 60. Controller 60 may comprise a microprocessor for controlling various portions of the television system, such as tuner 10 and the brightness, contrast and saturation sections (not shown) of one-chip television IC 100. Controller 60 and character generator 58 may be incorporated together in a single IC such as the so called "TELEKAT" television control IC available from Motorola Semiconductor Products, Inc. By way of example, controller 60 may cause character generator 58 to generate character signals for displaying the channel number of a newly selected channel and the present time whenever a user selects a new channel by means of a remote control system (not shown).

When ICs like the TA8680 IC are utilized, it is not readily possible to highlight characters by blanking, edging, shading or forming a "surround" because no IC input terminal intended to be used for receiving an externally generated blanking signal is provided. Therefore, it is not readily possible to blank video components prior to the insertion of signal levels corresponding to the pulses of the character signal into the R-Y and G-Y color difference signals.

As is illustrated by the embodiment shown in FIG. 1, the present invention utilizes the OSD provisions of one-chip television ICs such as the TA8680 in a highly unusual manner to provide for character blanking and/or edging, shading or forming a "surround". Specifically IC 100 is utilized in an unintended way in two respects:

(1) The character blanking signal generated by character generator 58 is coupled to one of the red (R) or green (G) character signal input terminals 136 and 138 of IC 100 (red character signal input terminal 136 is used in the illustrative embodiment) instead of a character signal.

(2) A fixed DC level corresponding to image black is coupled to character brightness control signal input terminal 140 of IC100 instead of an adjustable DC level suitable for displaying red or green characters.

Advantageously, the second of these is easily accomplished by connecting brightness control signal input terminal 122 directly to the power supply line for IC 100 which corresponds to the maximum amplitude excursion of the output luminance signal in the black-going direction. In the case of the TA8680, $+V_{CC}(+9$ volts) corresponds to the maximum amplitude excursion in the black-going direction. Accordingly, in the television receiver shown in FIG. 1, character control signal input terminal 140 is directly connected to the $+V_{CC}$ power supply line. As a result, the luminance signal produced at luminance signal output terminal 122 will represent image black at times corresponding to the pulses of the character blanking signal.

Having coupled the character blanking signal to one of the red (R) or green (G) character signal input terminals 136 and 138 (e.g., red character signal input terminal 136 in the illustrative embodiment), that character signal input terminal and the other (e.g., green character signal input terminal 138) are no longer available to receive the character signals from character generator 58. Therefore, another arrangement must be utilized to produce the body of the characters. In the present embodiment, this is accomplished by coupling the red (R), green (G) and blue (B) character signals produced by character generator directly to respective ones of kinescope drive circuits 32, 34 and 36. The connection of the character signals to the drive circuits will be described in detail with respect to FIG. 4.

Figure 4:
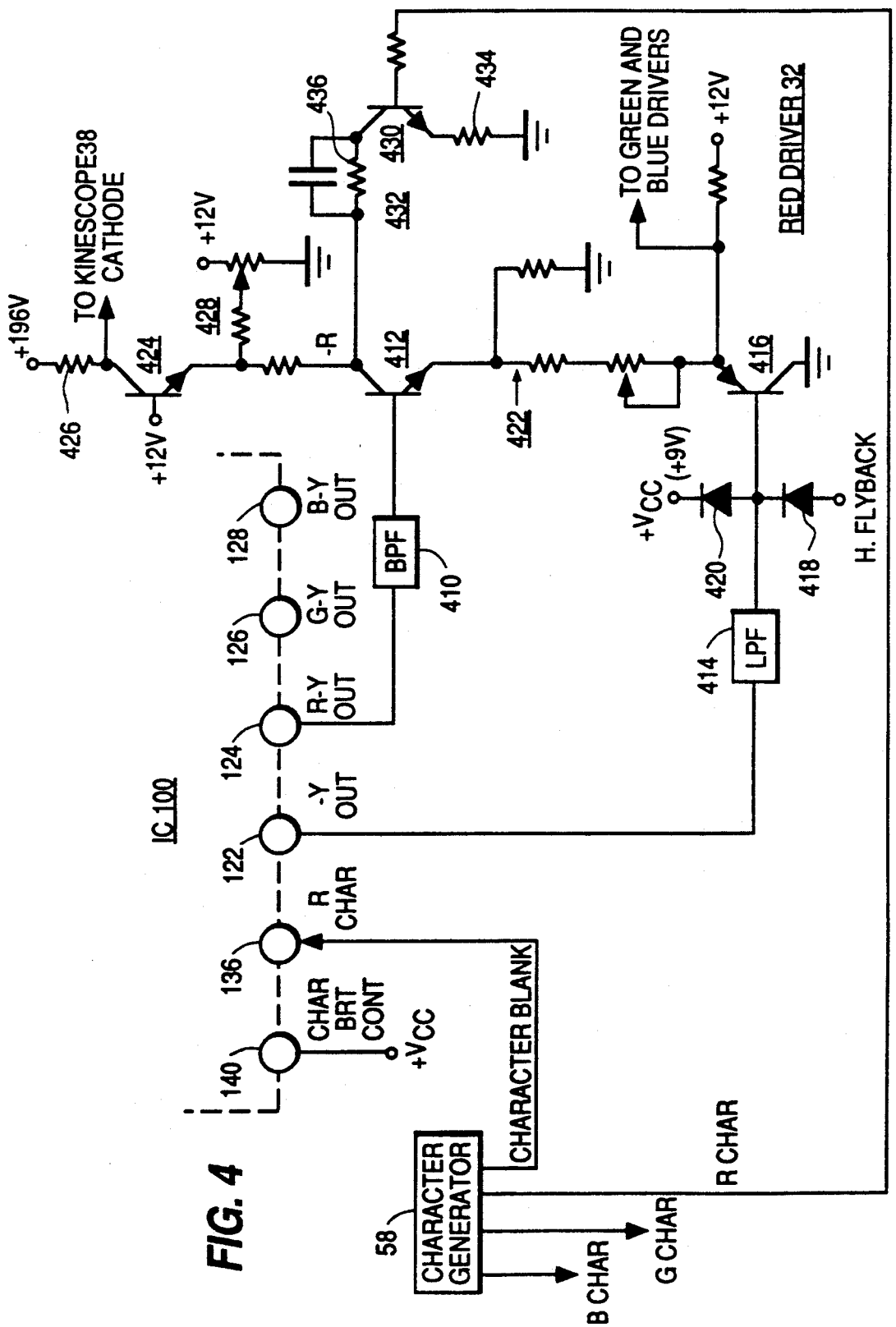
FIG. 4 is a circuit schematic of a portion of the OSD system shown in FIG. 1.

In FIG. 4, elements which have previously been described with respect to FIG. 1 are identified with the same reference numbers. New elements are identified with reference numbers in the "400s". FIG. 4 primarily shows the circuit configuration of red drive circuit 32. The circuit configurations of green and blue drive circuits 34 and 36 are substantially the same.

The red color difference (R-Y) signal produced at output terminal 124 of IC 100 is filtered by a bandpass filter (BPF) 410 in order to suppress unwanted high frequency signal components. The resulting signal is coupled to the base electrode of a NPN transistor 412 configured as a common emitter amplifier.

The luminance output signal produced at terminal 122 is filtered by a low pass filter (LPF) 414 in order to suppress unwanted high frequency signal components. The resulting signal is coupled to the base electrode of a PNP transistor 416 configured as an emitter-follower amplifier. The positive-going pulse portion of the horizontal flyback signal is also coupled to the base electrode of transistor 416 through a diode 418 in order to insert a horizontal blanking pulse into the luminance signal. A diode 420 is coupled between the base electrode of transistor 416 and the $+V_{CC}$ power supply line in order to clamp the horizontal blanking pulse to the $V_{CC}$ voltage level.

The luminance signal produced at the emitter electrode of PNP transistor 416 is coupled through an adjustable voltage divider 422 to the emitter electrode of NPN transistor 412. The purpose of adjustable voltage divider 422 is to set the gain of the red drive circuit 32.

Transistor 412 combines the red color difference (R-Y) signal coupled to its base electrode with the luminance (-Y) signal coupled to its emitter electrode to produce a red (-R) signal at its collector electrode. The red (-R) signal is coupled to the emitter electrode of a NPN transistor 424 configured as a common base amplifier. The base electrode of transistor 424 is coupled to a source of a relatively low voltage (e.g., +12 volts) and the collector electrode is coupled to a source of a relatively high voltage (e.g., +200 volts) through a load resistor 426. Transistors 412 and 424 comprise a cascode amplifier. The collector electrode of transistor is coupled to "red" cathode of the kinescope 38. A "red" kinescope gun bias adjusting circuit 428 is coupled between the collector electrode of transistor 412 and the emitter electrode of transistor 424.

The red character signal produced by character generator 58 is coupled to the base electrode of a NPN transistor 430 configured as a common emitter amplifier. The collector electrode of transistor 430 is coupled to the collector electrode of transistor 412 through a "speed-up" circuit 432.

Transistor 430 is driven into saturation in response to a red character pulses. This, in turn, causes transistor 424 to be driven into conduction, but not into saturation. As a result, a red scan line portion of the character are produced. Transistor 424 is not driven into saturation in order to preserve the response time needed to avoid smearing the character and to keep character brightness optimum. The values of an emitter resistor 434 and a collector resistor 436 of the common emitter amplifier configured transistor 430 are selected to provide a red character of desired brightness, e.g. in the order of 60 to 70 IRE units.

To the extent that transistor 412 is not bypassed by conducting transistor 430, the visibility of video information otherwise due to the R-Y color difference signal is substantially eliminated because of the character blanking pulse which has been inserted into the luminance signal produced at the output terminal 122 of IC 100, as previously described. The character blanking pulse is coupled by emitter-follower configured transistor 416 to the emitter electrode of common emitter configured transistor 412 and causes the latter to be rendered nonconductive. The high level of the character blanking pulse also renders transistor 412 nonconductive so as to produce the black edges adjacent to the character body when the character pulse is not at the high level (see FIG. 2).

It is possible to by-pass a one chip television IC such as the TA8680 entirely for producing characters which are highlighted by blanking, edging, shading or forming a "surround". However, in that case, an external "fast" video switch must be used for character blanking. The present invention avoids this requirement.

The same character drive circuitry of one-chip television IC 100 which is used to for character blanking and/or edging, shading or forming a "surround" according to one aspect of the invention, may also be used to blank the image for other purposes. For example, it is desirable to blank the entire image while the channel to which tuner 10 is tuned is being changed to avoid displaying noise and other transient responses which are produced when tuner 10 is not stably tuned to a channel. Specifically, as is indicated in FIG. 1, controller 60 generates a "channel change" signal when tuner 10 is caused to change channels in response to a user initiated command. The "channel change" signal is coupled to red (R) character input terminal 136 through the same conductor which is used for the "character blanking" signal by virtue of an "or" function circuit represented by "or" gate 62. As a result, the display will be "blanked" during channel changes is the same manner that it is blanked for characters.

While the invention has been described with reference to a television receiver which itself includes a display device, the invention is also useful in a television receiver, such as a VCR, which does not itself include a display device but which is intended to be used in conjunction with a display device. In addition, the invention is useful in a television system, such as a monitor, which does not include a tuner. These and other modifications are intended to be covered by the following claims.

I claim:
1. In a television system, apparatus comprising:
means for providing an input video signal including luminance and chrominance components;
means for generating at least one character signal having pulses corresponding to the body of a character and a character blanking signal having pulses corresponding to at least one of an area said body of said character and an area adjacent to said body of said character;
signal processing means for processing said luminance and chrominance components of said input video signal to produce a luminance-representative output video signal and a color-representative output video signal;
said signal processing means including an input intended to be used for receiving said character signal; means for inserting a level into said color-representative signal at times corresponding to the times of occurrence of said pulses of said character signal; an input intended to be used for receiving an adjustable character brightness control signal; and means for inserting a level determined by said character brightness control signal into said luminance-representative signal at times corresponding to the times of occurrence of said pulses of said character signal;
means for coupling said color-representative signal and said luminance-representative signal to an image reproducing device;
means for coupling said character blanking signal to said input for receiving a character signal of said signal processing means;
means for coupling a fixed level to said character brightness control input of said signal processing means; and
means for coupling said character signal to said means for coupling said color-representative signal and said luminance-representative signal to an image reproducing device.

2. The apparatus recited in claim 1, wherein:
said signal processing means is contained within an integrated circuit.

3. The apparatus recited in claim 1, wherein:
said fixed level provided by said means for coupling a fixed level to said character brightness control input of said signal processing means corresponds to a substantially black level of an image reproduced by said image reproducing device.

4. The apparatus recited in claim 1, wherein:
said pulses of said character blanking signal correspond to both of the entire area of the said body of said character and an area surrounding said body of said character.

5. The apparatus recited in claim 1, wherein:
said means for coupling said luminance-representative signal and said color-representative signal to an image reproducing device comprises a display driver.

6. The apparatus recited in claim 5, wherein:
said color-representative video output signal is a color difference signal; and
said display driver includes an input to which said luminance-representative signal is coupled; an input to which said color difference signal is coupled; means for combining said luminance-representative signal and said color difference signal to produce a color signal at a circuit point; and means for coupling said character body-representative signal to said circuit point at which said color signal is produced.

7. The apparatus recited in claim 1, wherein:
said color-representative video output signal is a color difference signal; and
said means for coupling said luminance-representative signal and said color-representative signal to an image reproducing device comprises means for combining said luminance-representative signal and said color-representative signal to produce a color signal and includes an input to which said luminance-representative signal is coupled, an input to which said color difference signal is coupled; a circuit point at which said color signal is produced; and means for coupling said character signal to said circuit point at which said color signal is produced.

8. In a television system, apparatus comprising:
means for providing an input video signal including luminance and chrominance components;
an integrated circuit including signal processing means for processing said luminance and chrominance components of said input video signal to produce a luminance-representative output video signal at a respective output terminal and a color-representative output video signal at a respective output terminal; said integrated circuit also including a first input terminal for receiving an input signal having pulses; means for inserting a level into said color-representative signal at times corresponding to the times of occurrence of said pulses of said input signal received at said first input terminal; a second input terminal for receiving a control signal; and means for inserting a level determined by said control signal received at said second input terminal into said luminance-representative signal at times corresponding to the times of occurrence of said signal received at said first input terminal; said first input terminal being intended to be used for receiving a character signal having pulses corresponding to the body of character of a predetermined color; and said second input terminal being intended to be used for receiving an adjustable character brightness control signal representing the brightness of said body of said character;
means for coupling said color-representative signal and said luminance-representative signal to an image reproducing device;
means for generating said character signal and a character blanking signal having pulses corresponding to at least one of said body of said character and an area adjacent to the body of said character;
means for coupling said character blanking signal to said first input terminal of said integrated circuit instead of said character signal;
means for coupling a fixed level corresponding substantially to the black level of an image reproduced by said image reproducing device to said second input terminal of said integrated circuit; and
means for coupling said character signal to said means for coupling said color-representative signal and said luminance-representative signal to an image reproducing device.

9. In a television system, apparatus comprising:
means for providing an input video signal including luminance and chrominance components;
an integrated circuit including signal processing means for processing said luminance and chrominance components of said input video signal to produce a luminance-representative output video signal at a respective output terminal and a color-representative output video signal at a respective output terminal; said integrated circuit also including a first input terminal for receiving an input signal having pulses; means for inserting a level into said color-representative signal at times corresponding to the times of occurrence of said pulses of said input signal received at said first input terminal; a second input terminal for receiving a control signal; and means for inserting a level determined by said control signal received at said second input terminal into said luminance-representative signal at times corresponding to the times of occurrence of said signal received at said first input terminal; said first input terminal being intended to be used for receiving a character signal having pulses corresponding to the body of character of a predetermined color; and said second input terminal being intended to be used for receiving an adjustable character brightness control signal representing the brightness of said body of said character;
means for coupling said color-representative signal and said luminance-representative signal to an image reproducing device;
means for generating a image blanking signal having pulses corresponding to a blank portion of an image reproduced by said image reproducing device;
means for coupling said blanking signal to said first input terminal of said integrated circuit instead of said character signal; and
means for coupling a fixed level corresponding substantially to the black level of an image reproduced by said image reproducing device to said second input terminal of said integrated circuit.

* * * * *